United States Patent
D'Amato (10) Patent No.: US 6,440,277 B1
(45) Date of Patent: Aug. 27, 2002

(54) TECHNIQUES OF PRINTING MICRO-STRUCTURE PATTERNS SUCH AS HOLOGRAMS DIRECTLY ONTO FINAL DOCUMENTS OR OTHER SUBSTRATES IN DISCRETE AREAS THEREOF

(76) Inventor: Salvatore F. D'Amato, 18 Meadow Ave., Monmouth Beach, NJ (US) 07750

( * ) Notice: Subject to any disclaimer, the term of this patent is extended or adjusted under 35 U.S.C. 154(b) by 0 days.

(21) Appl. No.: 09/521,580

(22) Filed: Mar. 9, 2000

Related U.S. Application Data (60) Provisional application No. 60/123,638, filed on Mar. 10, 1999.

(51) Int. Cl.[7] .............................. B41M 3/00; G03H 1/02; C23C 14/34
(52) U.S. Cl. .............................. 204/192.15; 204/192.3; 204/192.27; 204/192.34; 204/298.23; 204/298.24; 204/298.26; 118/212; 118/216; 118/244; 118/620; 118/718; 118/719; 427/487; 427/496; 427/504; 427/162; 427/255.5; 427/296; 430/1; 430/270.1; 264/1.1; 264/101
(58) Field of Search .......................... 204/192.15, 192.3, 204/192.27, 192.34, 298.23, 298.24, 298.26; 118/212, 216, 244, 620, 718, 719; 427/487, 496, 504, 162, 255.5, 296; 430/1, 270.1; 264/1.1, 101

(56) References Cited

U.S. PATENT DOCUMENTS

| | | | |
|---|---|---|---|
| 4,728,377 A | 3/1988 | Gallgher | |
| 4,933,120 A | 6/1990 | D'Amato et al. | |
| 5,003,915 A | * 4/1991 | D'Amato et al. | ............. 118/46 |
| 5,083,850 A | 1/1992 | Mallik et al. | |
| 5,116,548 A | 5/1992 | Mallik et al. | |
| 5,292,401 A | 3/1994 | Yoneda | |
| 5,464,710 A | * 11/1995 | Yang | ............................. 430/1 |
| 5,695,808 A | 12/1997 | Cueli | |
| 6,007,888 A | 12/1999 | Kime | ........................ 428/64.1 |

FOREIGN PATENT DOCUMENTS

EP          0540455 A1     5/1993

* cited by examiner

Primary Examiner—Alan Diamond (57) ABSTRACT

An improved method and apparatus for applying discrete area holograms or other optical devices directly onto documents or other substrates in a continuous process analogous to the operation of a printing press. The continuous process is carried out in a vacuum chamber in which at least two process steps are performed in sequence: the formation of a micro-grooved discrete resin area and a localized coating of it with a reflective or refractive material layer. The formation of the micro-grooved resin area can be accomplished by electron beam curing of the resin. The localized coating of the micro-grooved resin can be done by sputtering. One or more other steps, including pre-coating, post-coating and partial removal of the reflective or refractive layer, may also be carried out as part of the continuous process within the vacuum chamber.

29 Claims, 8 Drawing Sheets

TECHNIQUES OF PRINTING MICRO-STRUCTURE PATTERNS SUCH AS HOLOGRAMS DIRECTLY ONTO FINAL DOCUMENTS OR OTHER SUBSTRATES IN DISCRETE AREAS THEREOF

CROSS-REFERENCE TO A RELATED APPLICATION

This application claims the benefit of prior provisional patent application Ser. No. 60/123,638, filed Mar. 10, 1999, which provisional application is hereby incorporated herein by this reference.

BACKGROUND OF THE INVENTION

This invention relates to the technology of holography and the graphic arts and more specifically to an apparatus and method for making holograms with a reflective or refractive coating. Such holograms are used in a wide variety of security applications, such as on bank notes, credit cards, authenticating devices, I.D. cards (driver's licenses), product packaging, and the like, as well as for commercial applications such as sales promotion, greeting cards, and the like.

While the discussion herein is directed primarily toward applying holograms to documents or other substrates, the techniques are equally applicable to applying similar devices such as diffraction gratings, multiple diffraction gratings, kinegrams, pixelgrams, and the like. Generally, the techniques described herein apply to the use of any device with a micro "grooved" surface. The micro grooved surface is one containing line (grooves) with a frequency greater than about 6000 lines per inch, although in most cases the frequency may be closer to 25,000 lines per inch. It is the particular pattern of the micro-grooves of a surface that diffracts incident light into an image or other light pattern that is visible to the observer.

Currently, holograms are most commonly mass produced by a series of separate process steps as a thin plastic foil attached to a plastic carrier by a hot melt adhesive layer, then later individually attached to documents or other substrates by a hot stamping process. Such a process is described in U.S. Pat. No. 4,728,377, which is hereby incorporated herein by this reference. Generally, a second hot melt adhesive is included on the surface of the foil, and both adhesive layers are melted as the foil is pressed against the substrate to release the foil from the carrier and attach it to the substrate.

In a common method of mass producing such holograms, a liquid resin (oligomer) is held against the carrier by a surface containing the micro-grooves, which acts as a mold while the resin is hardened by curing. This process transfers the micro-grooves from the master surface to an exposed surface of the cured resin. The micro-grooves are then usually coated with a reflective or refractive material in order to increase the amount of incident light that is reflected from the grooves into a diffracted bean containing an image or other light pattern.

The resin is typically cured photo-chemically by exposure to ultra-violet radiation, and can, alternatively, be cured by electron beam radiation. In the case of an electron beam cure a separate vacuum chamber with an electron gun is used. Furthermore, it can be beneficial to use a vacuum for the coated substrate during the cure to eliminate oxygen from the curing resin and for other beneficial reasons. Subsequent depositing of a metal layer onto the micro-grooves of the cured resin is accomplished separately, typically in a vacuum chamber that is dedicated to that function. Metal is usually applied to the entire resin surface. Portions of the metal layer are sometimes subsequently removed in yet another separate process step with yet different equipment, in cases where this is necessary to provide the desired hologram foil. Some have experimented with applying the metal coating to defined areas by a chemical "reduction" or electroless chemical process but this has not proved to be particularly satisfactory.

A sputtering process has also been suggested for coating the micro-grooves of the resin with a metal. The sputtering of metal is also performed in a vacuum chamber containing a cathode and anode driven by an electrical power source connected between them. Metal contained on a surface of the cathode is sputtered off of that surface by ion bombardment. The sputtered metal molecules are then driven into the micro-grooved resin surface. The metal thus adheres very well to the micro-grooves.

There has long been a desire to make such holographic material in a continuous process. There has also been a desire to form holograms directly onto the end documents or other substrates in discrete areas thereof. By "discrete" is meant an isolated, defined area on the substrate. Holograms are now applied to substrates in discrete areas by the hot stamping process but it is desired to avoid making the holograms and applying them to substrates by separate discontinuous operations. There has also been a desire to combine such direct hologram formation with printing as part of a continuous printing process. Examples of the foregoing are given in U.S. Pat. Nos. 4,933,120, 5,003,915, 5,083,850 and 5,116,548, which are hereby incorporated herein by this reference.

SUMMARY OF THE INVENTION

Briefly and generally, the present invention provides for including two or more processing stations, as well as a substrate supply and take-up mechanism, all in a single vacuum chamber or in a series of two or more adjacent vacuum chambers formed within a common enclosure. When the substrate is in the form of a continuous web of sheet material, for example, the supply is in the form of a roll of the web and the take-up mechanism is a take-up roll. This allows two or more processing steps used to form discrete holograms on the substrate to be performed in-line rather than performing them separately at different times within different vacuum chambers and/or on other equipment. This also allows the processing steps to be performed sequentially without having to transfer the substrate between ambient pressure outside of the vacuum chamber and the reduced pressure within the chamber through air-lock chambers that are inherently lossy.

In one specific example, at least the processing steps of depositing the casting resin on the substrate, molding the resin with a holographic or other micro-groove master, curing the resin while in the mold and coating the cured micro-groove pattern with a layer of material that conforms to the surfaces of the micro-groves to increase their reflectivity in order to efficiently diffract light incident thereon, wherein at least one of these steps must be performed within a vacuum chamber. One such step that needs to be performed within a vacuum chamber is coating of the cured resin micro-grooves by a sputtering or evaporation of a thin metal layer thereon. Another such step that may best be performed within a vacuum chamber is the curing of the molded resin by an electron beam. When the curing and coating steps are carried out within a single vacuum chamber, the additional process steps of depositing and molding the resin on the substrate are most conveniently included as well even though they need not to be performed in a vacuum.

If two or more process steps need to be carried out at different levels of vacuum, two or more vacuum sub-chambers are then included within a primary vacuum chamber the substrate being moved between the two sub-chambers through an air-lock chamber between them that is satisfactory because the pressure difference between the sub-chambers will normally be significantly less than the difference between ambient pressure outside of the vacuum chamber and the pressure within the chamber. One or more other process steps may also be performed in-line on the substrate within the vacuum chamber, such as pre-coating the substrate prior to casting the micro-groove structure thereon, as an early step, removing some of the reflective layer according to a desired pattern and/or coating the completed discrete holograms as a later step. The removal of a portion of the reflective layer, if included in the process, can conveniently be accomplished by an ion etch technique within the vacuum chamber since such a technique needs to be carried out in a vacuum anyway. The substrate may also be subjected to conventional printing within the vacuum chamber in order to maximize the number of operations that may be performed in-line when one of them requires a vacuum.

These techniques can be used to form cast resin micro-groove patterns that are totally surrounded, or substantially surrounded, by the substrate, such as areas in the shape of a circle, rectangle or some irregular shape. These techniques can also be used to form cast resin micro-groove stripes that extend completely along the substrate in the direction of movement though the processing stations with areas of the substrate existing along the sides of the stripes. In a specific example of the use of stripes, multiple parallel stripes are formed along the length of a web and the web is later separated into individual substrates by cutting it with multiple substrates extending across the width of the web so that each substrate has a stripe running along it.

Additional features, objects and advantages of the present invention are included as part of the following description of representative embodiments, which description should be taken in conjunction with the accompanying drawings.

DESCRIPTION OF EXEMPLARY EMBODIMENTS

Figure 1A:
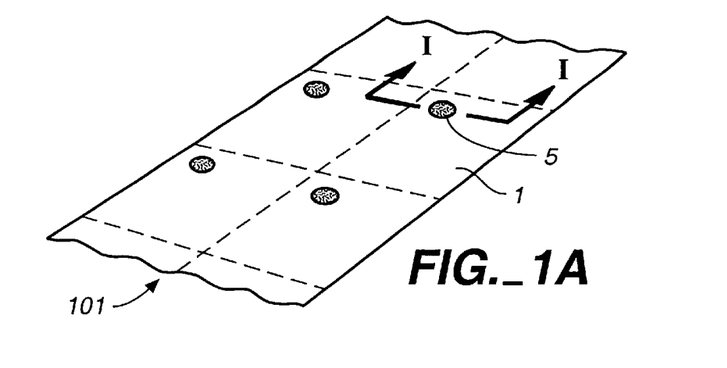
FIG. 1A is an illustration of a film or paper which serves as a base material on which a plurality of completed micro-structures in circular shape have been formed, each including micro-grooves in a surface thereof containing a reflective coating from which a holographic image can be viewed in reflected light.

Referring initially to FIG. 1A, one example of a continuous web of sheet material is illustrated after being processed, according to the techniques described below, with the devices (images) being two-wide across the width of the web. A large number of reflective micro-groove hologram regions have been formed on the web at predetermined intervals along the length of the web and with fixed spacing across the width of the web. These discrete holograms are shown to be circular in shape but can be most any other shape, and are totally surrounded by other areas of the web. The web is later separated, in one example, into substrate sheets, such as sheet 1, each of which contains one of the holograms, such as reflective hologram 5. Of course, more than one hologram can be formed on each substrate. Alternative to use of the continuous web, the individual substrate sheets may be individually fed through the process of forming discrete holograms on them but the individual sheets are generally more difficult to handle than the continuous web.

The various techniques of the present invention allow holograms, or other diffraction patterns, to be made in a continuous process with the application of several layers and in a manner that is analogous to the operation of a printing press. This is achieved by having a single vacuum chamber in which at least two of a plurality of process steps are performed. In other embodiments process steps are performed in the single vacuum chamber. The process is accomplished in a continuous and synchronous matter. Timing requirements are integrated in the single apparatus. Also, in a specific example, electron beam curing and metal coating can be localized on only the target area of the hologram. Demetallization can occur in the s&me chamber. The invention completes a localized holographic image and deposits, the reflective metal on the refractive surface in a single, efficient pass through the process steps. With prior systems, the various steps of the process were necessarily performed separately and not continuously or synchronously. The usual objective of prior systems has been to maintain the purity of each operation separately. Radiation beams were found only in the combination of cleaning a surface in preparation for deposition in the same chamber.

Figure 13:
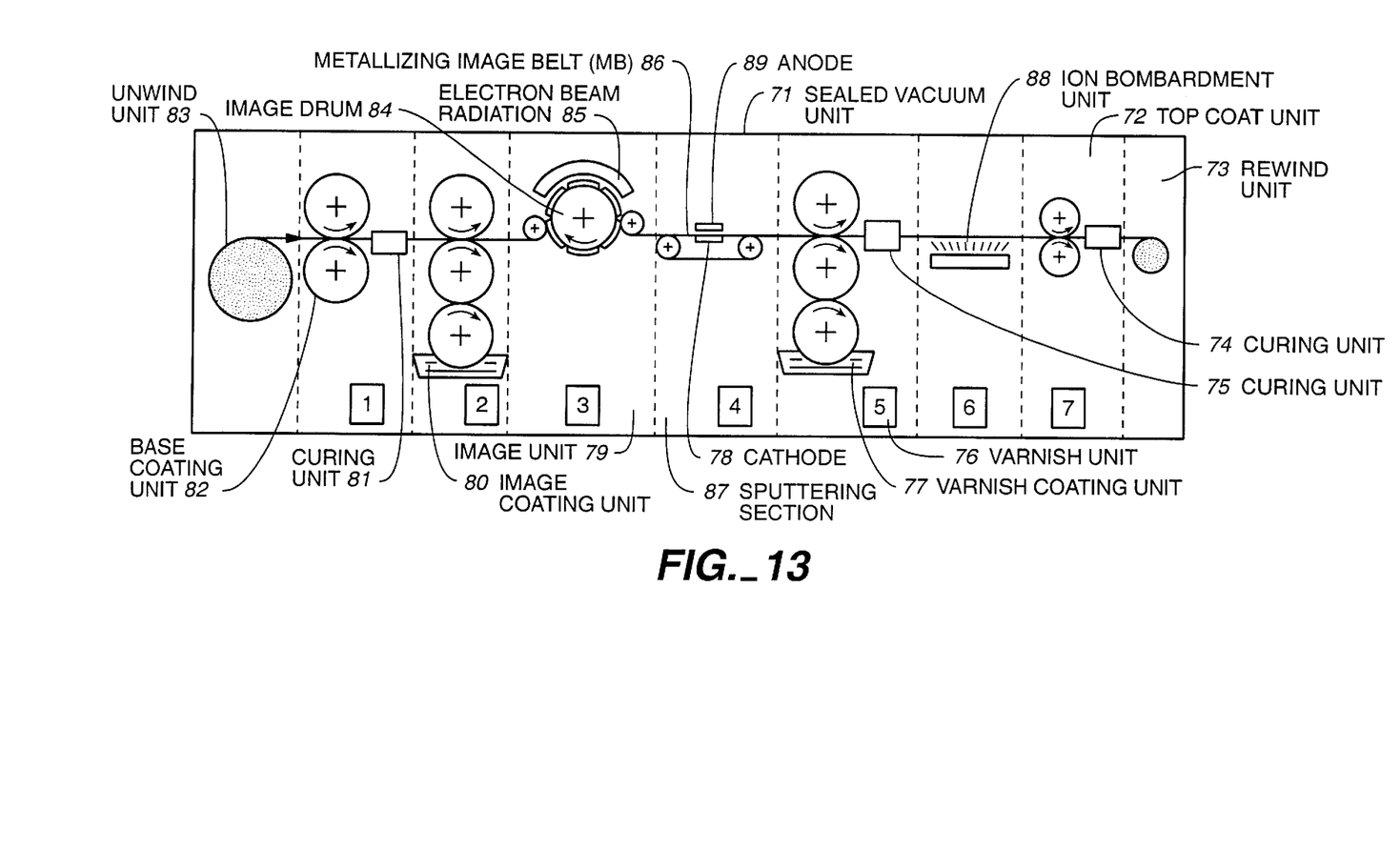
FIG. 13 shows one embodiment with unwinding, all seven process steps, and rewinding, including the Fish processing step comprising the adding a resist layer by a varnish coating unit to create pattern delineation and sputter etching, prior to the sixth demetallization process step, all carried out in the single integrated chamber, instead of using a belt of FIG. 12.

As shown in FIG. 13, an example process includes seven process steps, and the apparatus for accomplishing these seven steps can be described as having seven respective sections. The substrate material which is passed continuously through the various process steps is located, as the process begins, on the unwind unit 83. This substrate material may be paper or other flexible material such as plastic film, in a continuous strand or web, which is later cut into individual substrate sheets. Alternatively, individual sheets may be passed through the processing stations. When the final step of the process has been completed, the processed substrate material with a completed hologram, metallization over the hologram and possibly also top coating, is collected in the rewind unit 73.

Between such unwind and rewind units, the seven sections of the apparatus for performing seven steps of the process are located. Such seven sections may alternatively be used in various combinations in the several embodiments being described.

As an optional first step in the complete process, a flexible base coat may be applied to the substrate by the base coating unit 82 and then cured by the curing unit 81 as shown in FIG. 13.

A micro-grooved surface (FIG. 1B) of no particular size is provided. There should preferably be as good adhesion between this layer and the paper or film as there is between this layer and the metal surface. Depending upon the type (or porosity) of the substrate it may be necessary, to place a sub-coating into the substrate, in the areas that are to receive the oligomer. Such coatings (FIG. 2), for example, may be used, or required, to provide flexibility to the substrate, to improve the "hold-out" properties of the oligomer and to prevent it from "soaking" into the substrate. This layer may also substantially improve the crumple resistance. This sub-coating may also be required in order to serve as an intermediate bond between the oligomer and the substrate (a so-called "Tie Coating") or to improve the resistance of the image to a water, caustic or solvent "attack" from the opposite side of the banknote. With in-line printing equipment, such a coating can be applied by conventional printing methods. Such conventional printing can be in the form of Letterpress, Offset, Flexographic, Gravure or Silk Screen; depending upon the desired quantity (thickness) requirement of this sub-coating or other desired physical properties A cylinder is shown as the means of applying the micro-grooved surface to the substrate. It is also possible to form the required micro image into (on) a thin nickel belt. In this case the cylinder is replaced by a belt and two driving rollers (shafts). The belt may also be sprocket driven as mentioned for the "metaling" belt.

The relatively thin web also permits the use of efficient "air locks" on the input and exit of the any sub-chambers that are provided within the one vacuum chamber unit of FIG. 13. There may be certain cases where it is more advantageous to apply the image to the substrate in sheet form. This might be, for example, for use in-line with existing sheet-fed presses or existing designs. In this case, the chamber, and perhaps even coming into and out of the chamber, would be done by conventional sheet-fed printing press gripper bar and chain, that would take the sheet(s) through the holographic printing units. Such chain and gripper bars are typical on many high speed sheet-fed printing presses and more often, on the delivery end of these presses.

The second process step comprises passing the material-in-process through an image coating unit using oligomer coating. An oligomer may be defined as a liquid or viscous solution for use as a coating, and which is later subject to radiation curing.

Any conventional device can be used to apply the oligomer to the entire surface of a paper or film, or to discrete areas of the web, or to provide a course image coating or an image in the form of a relatively coarse printing screen such as a 100 line screen to as high as a 600 line screen. The latter screen can also be used (and probably with a pre-coat or sub-coat) as a means of having the micro image applied to discrete dots. A Gravure unit (conventional or with a nozzle), a Letterpress unit, a Flexographic unit, or a Silk Screen unit are all possible units for the application of the oligomer. The gravure coating unit, holographic image cylinder, and the sputtering belt have similar image areas in that each contains the same area of imagery in different form.

The third process step is curing the micro-image by use of electron beam radiation in the radiation unit 85.

There is a tendency for the E-Beam energy to weaken the fiber bond within the paper. This usually results in reduced fold endurance. It is therefore advisable to restrict the radiation as much as possible, to only that area occupied by the hologram. "masking" would therefore be employed in the cross-web direction so that the radiation would effect only a "ribbon area" in the web direction. There are also techniques to mask or "turn-on-and-off" the beam in the web direction, so that the radiation is restricted to a "rectangular" area. By doing so, the tendency towards weakening; is reduced to a minimum rectangular area which contains the imaged area, the actual area of which may be a circulate shape within the rectangle (square).

Figure 1B:
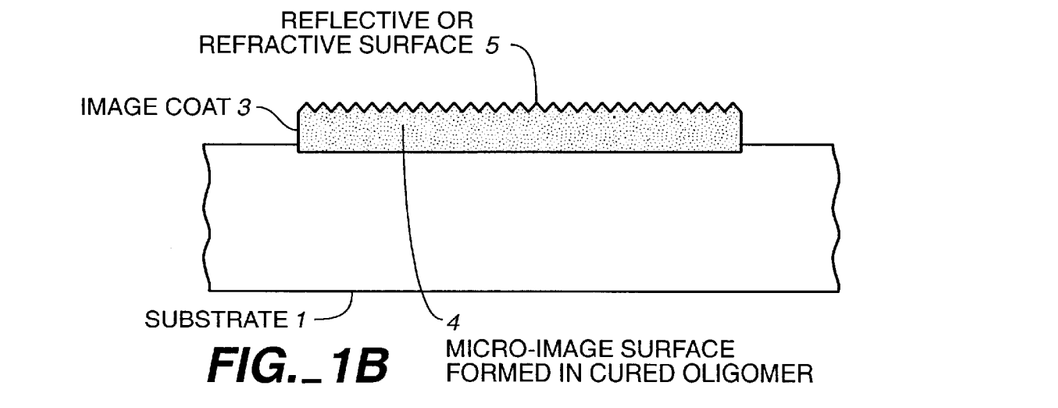
FIG. 1B is a cross-section of FIG. 1A, taken at section I—I thereof.
Figure 2:
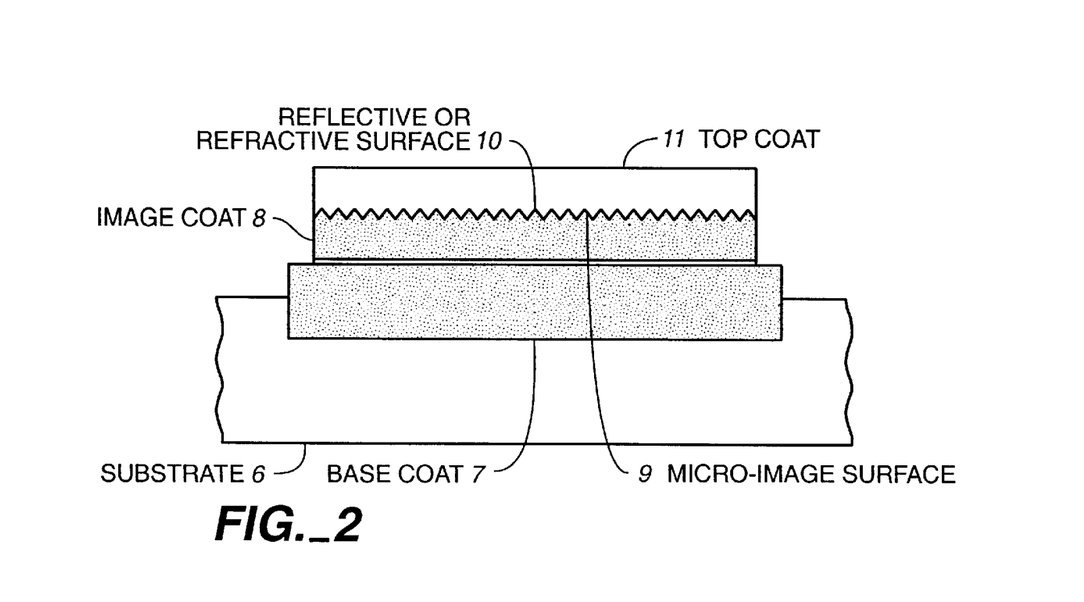
FIG. 2 shows an alternative to FIG. 1B in which an optional base coat is applied and cured prior to the image coat in order to provide adequate flexibility for the image coat and for hold-out properties prior to the application of the oligomer (imaged) coating. In addition, an optional top coat is shown for physical protection or image security.
Figure 3:
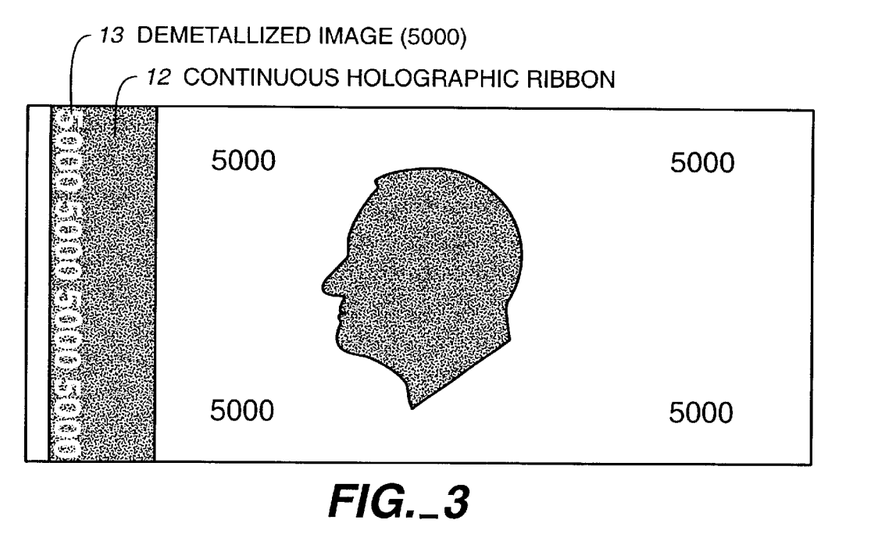
FIG. 3 shows an example of a product combining printing, holographic ribbon and demetallized image.

A circle or a button or a full overall coating of a holographic image is coated and cured with the E-Beam unit to create a holographic or other micro-image surface, as illustrated in FIGS. 1A, 1B and 2. It is also possible to place the holographic image in the form of a ribbon across the narrow dimension of the note web as produced in e-beam curing unit and metallizing unit. FIG. 3 shows one such note with the four notes or other substrates across web shown in FIG. 4. In the following, fourth step, sputtering metallizing, there would therefore be no need for a traveling belt mask as is provided for the round holograms, but simply "slits" between the cathode and the paper so as to restrict the metallizing to the already applied micro image ribbon extending along the length of the web.

Figure 7:
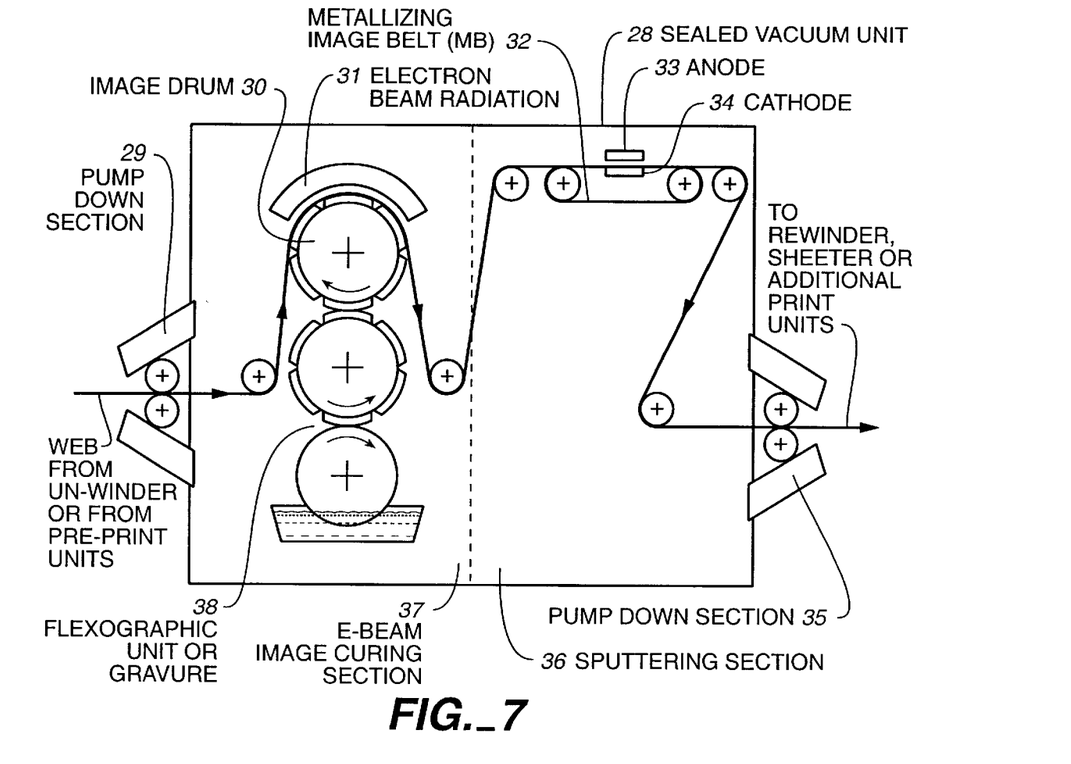
FIG. 7 shows another embodiment using a direct application of the oligomer to the image drum and electron beam curing in the same station, and using a masking belt in the sputtering section.

A simplification with respect of the oligomer application for the micro-image is to use a direct application of the oligomer to the image drum, as shown in FIG. 7. Directly applying the oligomer to the image drum (per FIG. 7) replaces process steps 2 and 3 with a single, combined step.

As an alternative, where there is not the need for the high quality of an E-beam cured oligomer while wrapped around the image drum, an embossable coating can be applied and cured in unit 2, and an image then embossed by heat and pressure in unit 3. This is a less expensive alternative to the above steps 2 and 3.

In the fourth process step, a refractive or reflective metallized coating is applied, in this example in a sputtering section 87 by a process known in this art as "sputtering" on top of the micro-image surface produced by the second and third process steps. This, metallized coating achieves view ability in light reflected from the micro-grooved pattern of the hologram.

The sputtered coating is a material appropriate for the application or the effect, such as a continuous, intermittent, or screened metal surface, or a continuous, intermittent or screen refractive surface. The metal can be aluminum, silver, gold, chromium, nickel, etc. The refractive coating is a coating whose refractive index is significantly different than that of the resin (oligomer) layer.

Figure 5A:
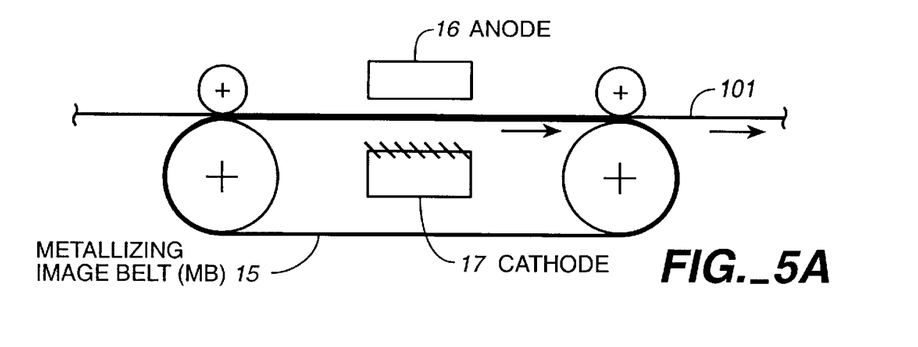
FIG. 5A shows one method of metallization by sputtering with the use of a masking belt that moves in contact with the web and at the same speed.

The sputtered metal is contained on the inside of the cylinder, in order to mask the application to the web. A metal "remover" is provided on the inside of the cylinder. The metallizing image cylinder shown in FIG. 6 can be replaced by a thin nickel, steel or plastic belt which would have the required "cut-outs" corresponding to the micro-images on them cylinder. This is shown in FIG. 7. If a belt is used, which may be the preferable method, the belt could be a thin nickel or steel or plastic belt with holes in it to correspond to the image area that is being metallized and a scraping bar at the same point to remove metal from the inside of the belt. Alternatively, the belt can be periodically changed rather than including a scraping bar to prevent metal accumulation. The belts would then be cleaned of metal (or other material) outside of the vacuum chamber and re-used. The external cleaning may be the preferred method of operation. The belt shown in FIG. 5A is oriented on the bottom of the web, which is the side to which the micro-groove device adherers. Ideally, the belt(s) are replaced with clean ones at the same time as a web roll is changed in either the unwind unit or the rewind unit.

A release coating might be used on the inside of the metallizing cylinder or profiled belt in order to facilitate the removal of the metal deposit on the inside of the cylinder or belt, or the belt may be made of a plastic material with certain release properties.

The belt is driven in synchronism with the holographic image drum and in register with the web in going from the holographic image cylinder to the sputtering belt. The belt may even have sprocket holes along one or both edges of the belt which may be used to maintain register between the previously applied micro-image and the openings in the belt. The openings in the belt would also have been applied in register to these sprocket holes. These sprocket holes might be the typical ½ inch pitch holes used for example on computer forms.

It is noted that the apertures in the belt (or cylinder) must be in reasonably good register to the already applied micro image. It may be necessary to provide an "edge guide" between the imaging unit 3 and the sputtering unit 4 in order to eliminate mis-register resulting from a possible tendency for the web to move sideways (weave). This same edge-guide provision may be required just before the demetallization unit(s) 5 and 6.

FIG. 7 also shows the belt on the lower side of the web so the metal coating being sputtered between the cathode and the anode go through the belt which serves as a mask for the coating and then go on to the underside of the web which in fact does have the image. The sealed vacuum unit contains both the image drum as well as the profile belt and so the web comes in with the base coating either continuously or in discrete areas. The image placed by the drum and cured by the E-beam goes on to the sputtering section where the metal is placed onto the underside of the web. All units, including the coating unit of the first process step, the holographic image cylinder and the MB unit run in synchronism. The resulting web is therefore imaged and metallized. The MB belt unit is run in register to the HI unit, i.e., while it is in synchronism, its position may be varied in a web direction to get the required registration correction.

The oligomer may also be applied directly to the image drum via a gravure or flexogiaphic cylinder, and the image is then cured while in contact with the web. Three cylinders could all be located in the "Imaging Potion" of the vacuum chamber, as shown in FIG. 7. Then the web would go to the metallizing section of the vacuum chamber where a reflective metal is sputtered on the image.

Figures 5B, 5C, 5D, 5E:
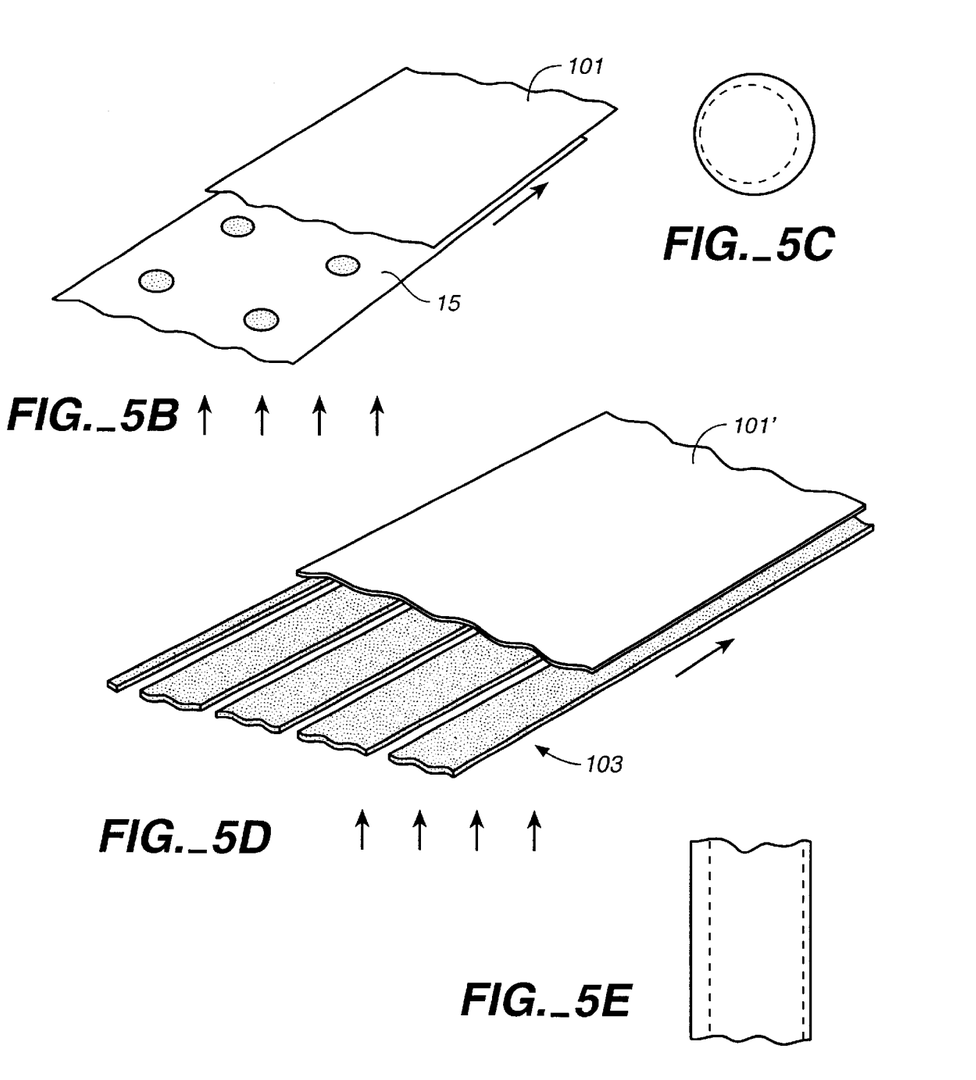
FIG. 5B shows a masking belt used to metallize discrete micro-grooved devices on a web.
FIG. 5C is a plan view of a metallized device made according to the sputtering technique of FIGS. 5A and 5B.
FIG. 5D shows a masking belt used to metallize continuous strips of micro-grooved devices on a web, using a stationary mask.
FIG. 5E is a plan view of a metallized device made according to the sputtering technique of FIG. 5D.

As an alternative, when the desired micro-image is in the form of a stripe running in one direction, the mask required to concentrate the metal being deposited onto the micro-imaged surface is a fixed slot that prevents metal from being deposited except where the stripe created by the slot would be located. This special application would not require the traveling belt shown in FIG. 13 as part of process step 4. An example of fixed masks is shown in FIG. 5D. Edge guiding may also be necessary with a metallized stripe or ribbon.

The next process steps are part of demetallization sometimes used in making optically variable devices (OVD). Demetallization is the removal of the metal coating in discrete areas where the area of removal is either too small to be "eliminated" with the MB belt, or the shape does not permit it to be used in the MB belt, e.g., any "closed loop" number or letter such as O, 6, 9, B, etc. or for any extremely small letters, figures or numbers. Demetallizing selected portions of the micro-image is achieved by applying a resistant coating to areas desired to have material retained and abrading away exposed metal. See FIG. 12 which shows clear text demetallized from a metallized layer. A halftone pattern could also be used to retain the holographic image as well. A resistance varnish coating is applied in the desired pattern, as step 5 to form a mask, and the exposed metal is removed by some convenient technique such as sputter-etching, as step 6.

A demetallized dot pattern can be created by printing the "reverse" of the image in step 5 and then sputter etching the remainder so as to leave a "clear" dot pattern which is metallized. Its purpose(s) might be to show an image that was pre-printed on the web or for the added security of having a "half-tone" holographic image.

The ion bombardment process removes metal to a resolution of 1 micron in width. The metal to be removed is only approximately 100 to 200 angstroms in thickness.

Figure 12:
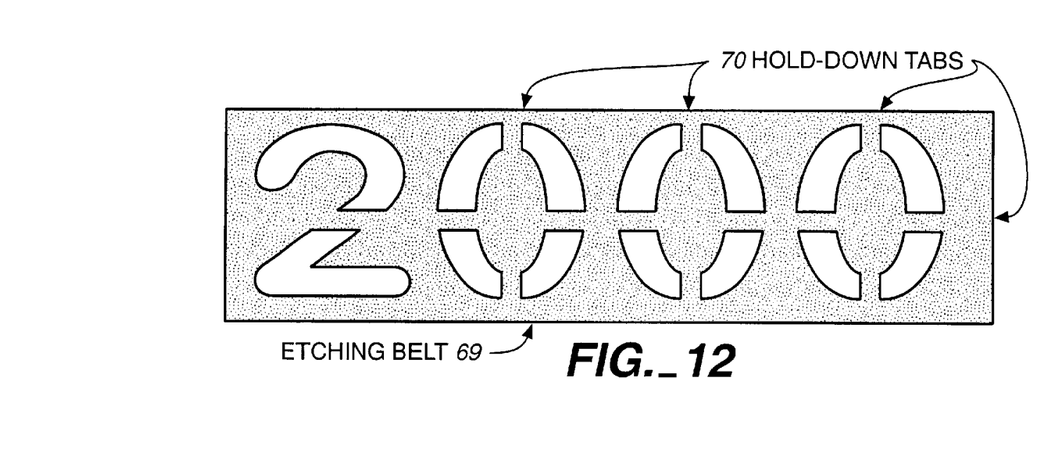
FIG. 12 shows an example of demetallized text that can be applied to a belt and demetallizing performed in a single chamber.

In certain cases it is also possible to create text (demetallized letters, numbers, or figures) without the use of the pre-coat varnish of unit 5. In such cases it is possible to us a profile belt in unit 6 similar to that belt in Step 4 (metallizing image belt, MB) except that the cut-out would contain areas that are to be demetallized. Such a cut-out is shown in FIG. 12. Such a belt would look similar to that in Step 4, and would also run in synchronism with the web. This belt and demetallization, without the use of a pre-coat varnish, is shown as step 5 of FIG. 10. The ion generating unit would be inside the belt and facing the bottom (imaged) side of the web. Note that some letters, numbers, and figures would require hold-down "Tabs" in order to support portions of certain figures, for example, the center of the zero (and also to "Brace" the shape such as the "2"). The area of the hologram corresponding to these hold-down tabs would of course not be demetallized, and the resulting shapes would look like "stenciled" figures.

The seventh process step applies a top coat to protect the hologram and to provide security against copying, by the top coat unit 72 and then curing by the curing unit 74. This "copying" can be achieved by electro-deposition of a suitable coating (probably a metal) against this exposed microsurface. It is therefore desirable and sometimes considered necessary, to "fill-in" or cover the micro groves with a transparent coating.

Figure 8:
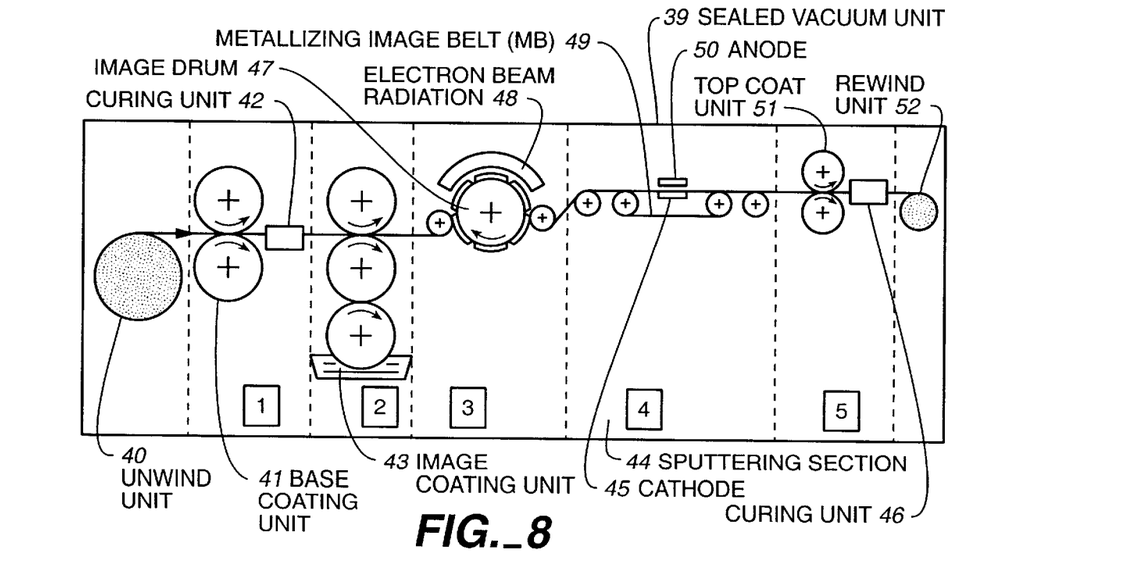
FIG. 8 shows the apparatus for performing one embodiment within a single, integrated vacuum chamber.

A large vacuum chamber shown in FIG. 8 is provided that has opposing front and back ends. Other parts of the apparatus, the process it performs, and the product being processed are identified in the drawings.

FIG. 1B gives a cross-sectional view of one example of the micro-grooved devices that are attached to the substrates of FIG. 1A, taken at section I—I thereof. A substrate 1, image coat 3, micro-image surface formed in cured oligomer 4 and a thin reflective layer 5 that conforms to the surface relief pattern of the micro-grooves. Light is,, then reflected off the top surface of the reflective layer 5. As an alternative to the reflective layer, a transparent layer of material having a refractive index significantly, different than that of the underlying cured oligomer 4 may be used, in which case the layer can fill in the grooves since light is reflected from the micro-grooved interface between the layers 3 and 5. FIG. 2 shows a modified hologram device structure that includes a substrate 6, base coat 7, image coat 8, micro-image surface 9, reflective or refractive surface 10, and top coat 11. The layers 8, 10 and 11 are attached firmly attached to one another in order to make it difficult to disassemble the structure to gain access to the micro-grooved pattern to duplicate it.

FIG. 3 shows another example of a holographic device being placed on a document or other substrate that may be made by the processes described herein. A micro-grooved device 12 is a ribbon extending completely across the substrate in one direction with regions of the substrate on either side. Alternatively, the ribbon 12 may be positioned immediately along one edge of the substrate. If the =micro-grooves are coated with an opaque layer of reflecting material such as a metal a portion of that metal layer may subsequently be removed to leave a desired pattern such as recognizable alpha-numeric characters. An image 13 of the number "5000" is repeatedly formed along the length of the ribbon 12 by selectively removing the metal layer in a pattern of the desired image, in the example of FIG. 3. Images and information may be added by conventional printing to other areas of the substrate, the profile of a man's head and numbers being shown printed in the example of FIG. 3. The printing can be done either as part of a continuous process combining the hologram device formation and printing processes, or as a separate process performed either before or after formation of the micro-grooved diffraction devices on the substrates.

Figure 4:
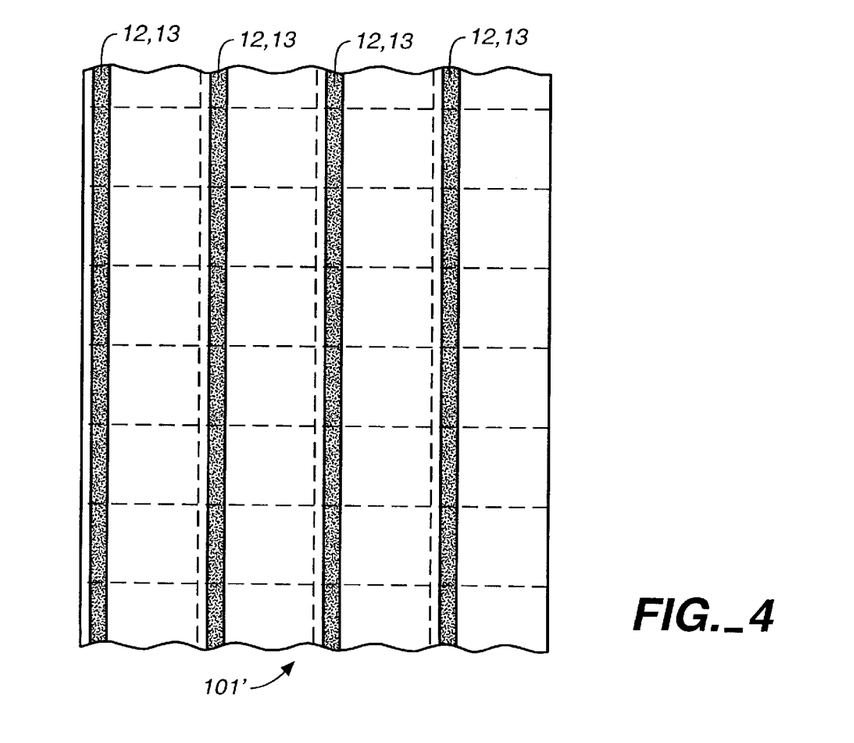
FIG. 4 shows how a web of four such notes across might appear.

FIG. 4 shows how a web of notes or other substrates according to FIG. 3 can be arranged on a continuous web during processing, four such notes being arranged across the width of the web in this example. The regions of the web on which the micro-grooved ribbons 12 are formed are thus continuous along the length of the web, being spaced apart across the width of the web and parallel with each other.

After processing, the web is separated along the dashed lines into individual notes or other documents, such as that shown in FIG. 3.

FIG. 5A illustrates the structure of a section for metallizing the micro-groove patterns of the discrete areas of cured oligomer on a continuous web 101. A mask belt (MB) 15 is moved along its length through the sputtering station at the same speed as the web 101 and in contact with the web. The belt 15 and web 101 move in between an anode 16 and a cathode 17 of the sputtering equipment. As best shown in FIG. 5B, the mask 15 has holes positioned for alignment with the discrete devices being formed on the underside of the web 101. Metal ions are then sputtered upward from the cathode 17, through the holes of the mask 15 and onto the underside of the web 101. Precise registration of the mask openings with the previously cured resin micro-groove devices is usually not required. As shown in FIG 5C, the sputtered metal layer (solid circle) may be larger than the cured resin area (dashed circled, and offset somewhat. The circular openings in the mask 15 are then intentionally made to be slightly larger than the size of the cured resin micro-grooves being metallized. The resulting metallization of the web in small areas around the cured resin is usually not a problem and makes formation of the complete devices somewhat easier.

FIG. 5D illustrates use of a fixed mask 103 having continuous elongated openings through which strips of metal are sputtered in order to process the web in a manner shown in FIG. 4. The mask 103 replaces the mask 15 and its driving rollers of FIG. 5A, and is positioned between the anode 16 and the cathode 17. The web 101' is then moved over the mask 103 with its underside in contact with a top surface of the mask. FIG. 5E illustrates that the metal layer (solid lines) can be wider than the strip of cured resin (dashed lines) being coated, with a resultant relaxation in the registration requirement of the mask with the web. Indeed, the metallized area may extend significantly beyond the cured resin regions in order to allow the metal layer in such other regions to be removed in some desired pattern, such as shown in the example substrate of FIG. 3 where the numbers may be so formed. Further, areas of the substrate separated from the cured resin holographic devices may be metallized and then partially demetallized as part of the continuous process.

Figure 6:
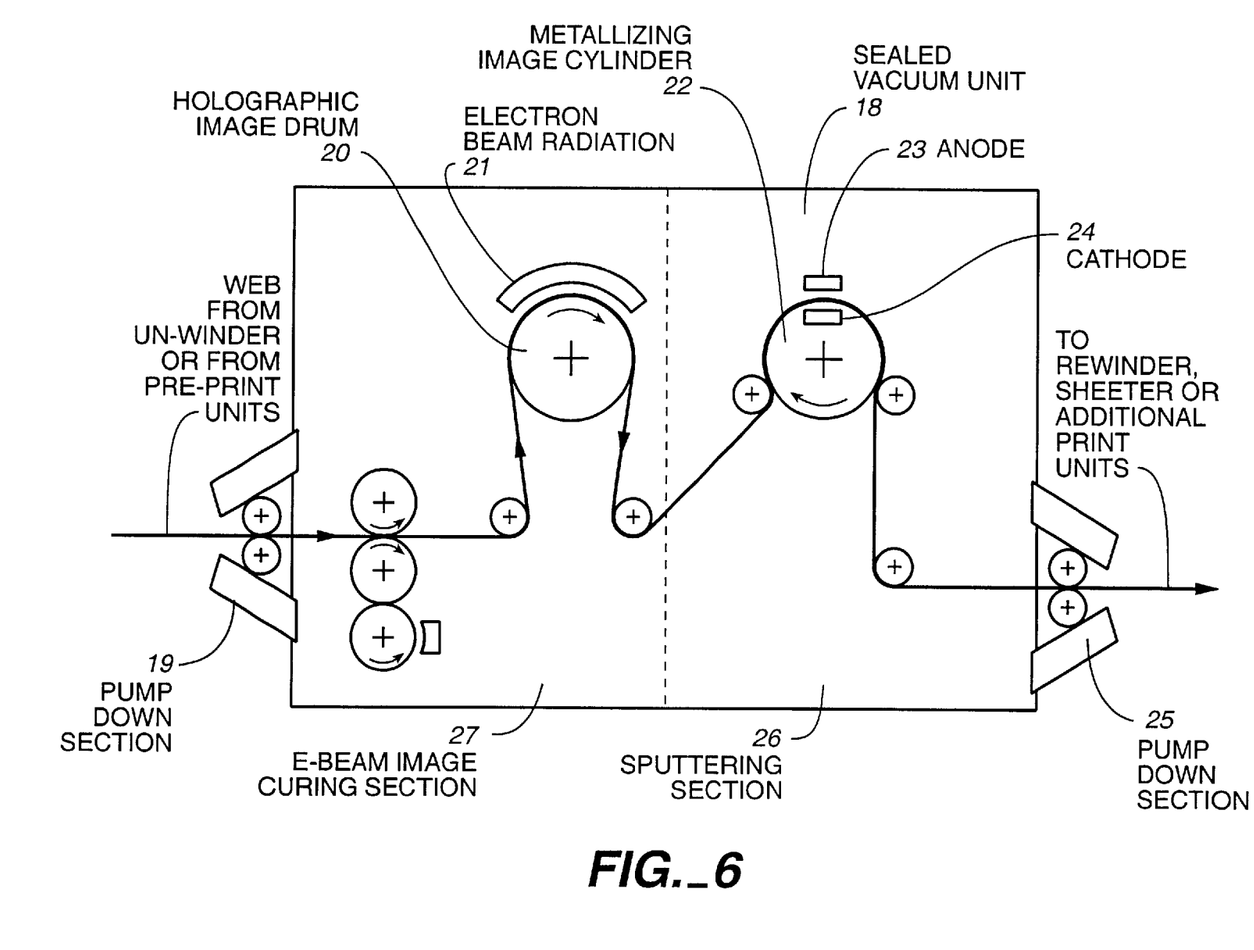
FIG. 6 shows one embodiment with coating step, curing step and metaling step using a metallizing image cylinder, all in a single, sealed vacuum chamber.

The electron beam resin curing section and the sputtering section may both be operated in a very low pressure environment. They are beneficially positioned in a common vacuum chamber that may be maintained at a different pressure level than other portions of the vacuum apparatus. FIG. 6 shows such a sealed vacuum unit receiving the web through a pump down section 19 and delivering the processed web through a pump down section 25. A holographic image drum 20 provides the surface relief molds that hold liquid resin against the web while passing under a source 21 of electron beam radiation. The resin is initially applied to the web by the previous rollers of the curing section 27. The pattern of such resin areas on the web can be, for example, that of either of FIGS. 1A or 4. Alternatively, the curing section 27 can be used to apply and cure a uniform layer of resin over all or part of the surface of the web, without any micro-grooves thereon as a base coating for subsequent operations. The resin areas of the web that are now cured, either with a smooth surface or with the surface relief patterns of the micro-grooves, are passed to a sputtering station to coat the surface with a thin layer of metal by sputtering.

The sputtering section 26 of FIG. 6 can employ the system described above with respect to FIGS. 5A–5E but a different form of system is shown in FIG. 6. Rather than a belt mask a cylinder 22 is used both to guide the web through the station and serve as a sputtering mask. The cylinder 22 has openings of sizes and in a pattern corresponding to that of the substrate to be coated with the metal layer. The cathode 24 of the device, from which the metal ions are sputtered, is positioned within the cylinder 22 and the anode 23 outside of it. The cylinder 22 is rotated so that its outer circumference moves at the same speed as the web passing through the station. The outer surface of the cylinder 22 and the web are then moving without any relative velocity between them. Alternatively, if metal is being sputtered in long stripes, such as shown in FIG. 4, the drum 22 does not need to be rotated but it is usually preferable to do so for mechanical reasons.

FIG. 7 shows an alternative sealed vacuum unit for performing the same functions as FIG. 6 but in somewhat different ways. A flexographic or Gravure roller 38 receives liquid resin from another roller beneath it that is rotated through a bath of resin. Liquid resin is then applied by the roller 38 to raised areas of an image drum 30 that contain the surface relief patterns desired to be transferred as microgrooves on the holographic devices being formed. Liquid resin held against these surface relief patterns is then cured by the source 31 of electron beam radiation. The web is then passed into a sputtering section 36 having, in this example, the structure described with respect to FIGS. 5A–5E.

FIG. 8 shows a sealed vacuum unit 39 that contains five processing units plus provisions to supply fresh web material and take up processed web material. An unwind unit 40 provides web material to a base coating unit that includes drums 41 that uniformly apply liquid resin to all or a defined portion of the web and a unit 42 for curing the applied resin. A next unit 43 applies liquid resin in a desired pattern for formation of the hologram devices. An image drum 47 holds surface relief patterns against the liquid resin areas on the web while being cured by an electron beam curing unit 48. Next, the web passes into a sputtering section 44 that includes a cathode 45, an anode 50 and a mask belt 49. A next station applies a coat of liquid resin by rollers 51 to the metallized micro-grooves, and a unit 46 cures that resin, in, order to provide a smooth top surface to the hologram devices. The web is then collected by a rewind unit 52. The curing units 42 and 46 can also be electron beam, units but usually will be simpler actinic radiation (such as ultraviolet light) curing devices. The resin material is appropriately chosen for the method used to cure it. It can be seen from FIG. 8 that multiple operations on the web are accomplished in a continuous process. The vacuum chamber unit 39 need be opened only when an entire roll of web material has been processed and must be replaced.

Figure 9:
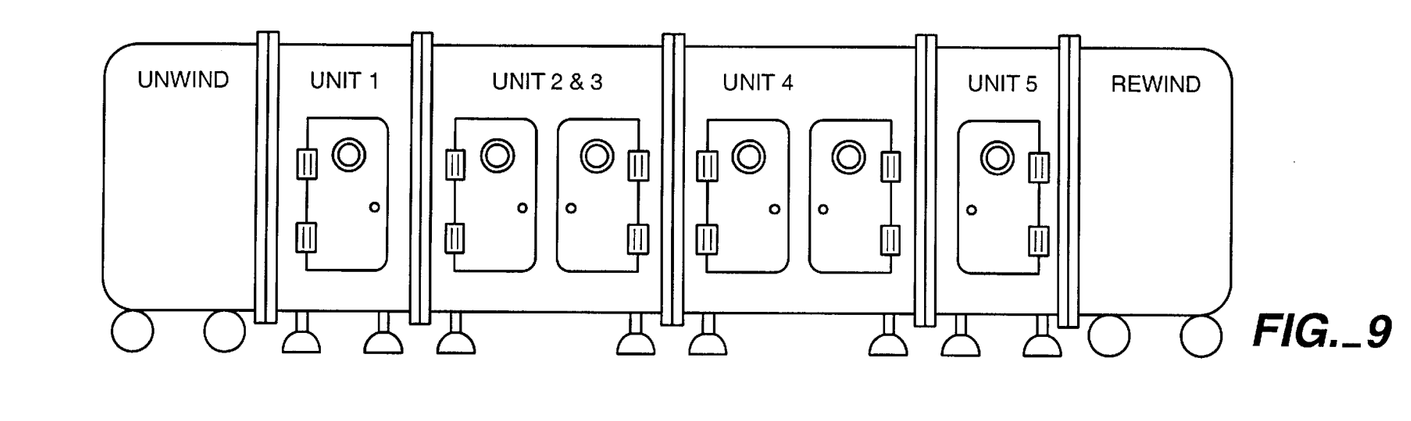
FIG. 9 shows an example of the exterior of said single, integrated vacuum chamber of FIG. 8.

FIG. 9 schematically represents an outside of a system for carrying out the process steps described with respect to FIG. 8. The unwind unit, the units 1, 2, 3, 4 and 5, and the rewind unit are each installed in a separate enclosure, except for units 2 and 3 which are preferably combined. All of the enclosures are connected to form a single vacuum chamber except that one or more of the units may be installed in a sub-chamber to provide a different pressure level for their operation.

Figure 10:
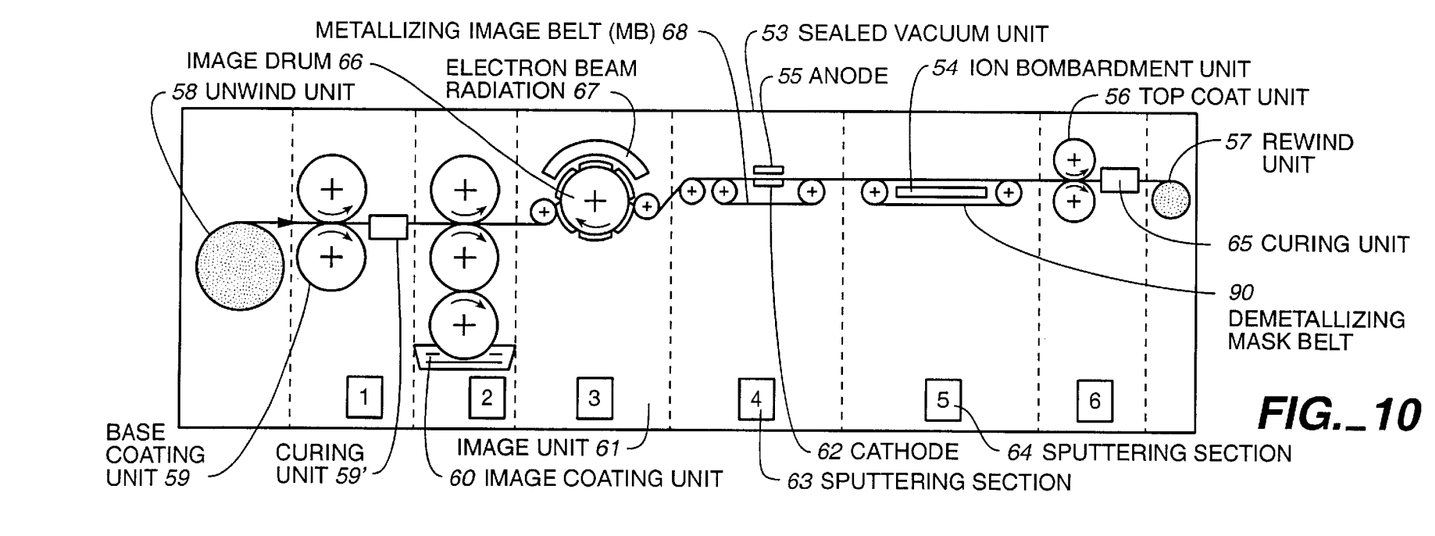
FIG. 10 shows another embodiment which includes the additional step of demetallizing discrete portions by ion bombardment (or sputter etching).

FIG. 10 illustrates a system like that of FIG. 8 but with an additional processing station added. The added unit is a plasma etching section 64, positioned between the metal coating sputtering unit and the top coating unit. An ion bombardment device 54 is positioned under a mask belt 90, and directs ions against the web through openings in the mask The mask belt 90 is moved at the same speed as the web, in the same manner as described for the metal sputtering unit. As an alternative to the mask, a varnish, resist material, and the like, can be coated over the web to cover areas of the metal layer that are not to be removed, and turned into a mask by curing the coating. Other etching techniques can alternatively be used but the nature of the web material, particularly if paper, win usually limit etching to a dry technique. This optional etching unit is used, for example, to form the numbers within the metallized strip on the substrate of FIG. 3 by completely removing the metal in a pattern of the numbers. It can also be used to remove only part of the metal layer over a portion of the surface of the layer to provide a different visual effect. Further, demetallization is convenient to form holes in, or lines through a discrete metal layer, where it is difficult to initially form the layer in such a pattern by sputtering through a mask. Another example of the use of the demetallization step is to form scalloped edges to deposited metal layer areas, again something that is quite difficult to obtain by the metallization step alone.

Figure 11:
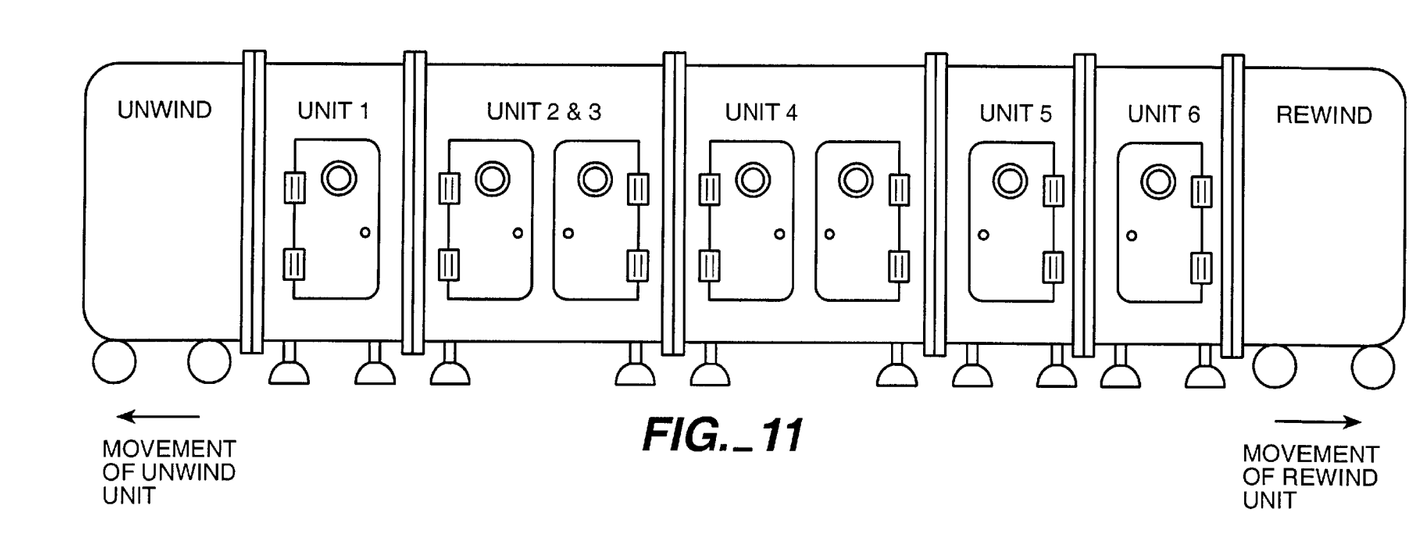
FIG. 11 shows the exterior of the apparatus performing the embodiment of FIG. 10.

FIG. 11 illustrates generally an outside of a vacuum system that carries out the processes of FIG. 10. Included are structures for the unwind unit, for each of units 1, 2&3, 4, 5 and 6, and the rewind unit. FIG. 12 shows an etching belt 69, and hold-down tabs 70.

FIG. 13 shows a sealed vacuum system like that of FIG. 10 except that the demetallizing unit 64 is separated into two units: a varnish unit 76 and an ion bombardment unit 88. As previously mentioned, a metal layer etching mask can be formed directly on the web by use of an appropriate mask material. In FIG. 13, a varnish or other curable liquid is printed onto the web by a varnish coating unit 77 in a pattern that covers the web areas to be protected during the metal removal operation. That varnish is cured as the web passes through a curing unit 75. Those portions of the metal layer exposed by not having a varnish layer are then removed as the web passes, an ion bombardment unit 88. The varnish mask can be left in place on the final substrate. If so, since the varnish will usually cover the retained micro-groove pattern application of a protective coating by the top coat unit 72 can be omitted.

The high vacuum chamber defines the confines of the printing machine. When certain units are run in-line, but outside the vacuum chamber, as is a possible but not the preferred arrangement, there are air locks at the input and output of the unit, created, for example, by use of a double set of close cylinders. A pump down chamber before coming into the high vacuum chamber and a pump down chamber coming out of such high vacuum chamber could be used to lessen the leakage.

In a specific embodiment, the entire apparatus is placed in the single, integrated vacuum chamber. In this embodiment, shown as FIGS. 8, 10 and 13, the entire machine including the unwind and rewind which are on separate carriages are put inside a single chamber that is evacuated. The exterior is illustrated in FIG. 9 and FIG. 11. The two carriages are separated from the main section, a new roll of paper is added to the unwinder, and the finished roll removed from the rewinder. The two units are then locked back into the machine and then the entire machine is brought to a vacuum. The machine then is brought up to speed and the new paper is unwound, processed through the various units and then rewound, before again unlocking the two carriages. The result is a substantial reduction in the power requirements since pressure increase through the rotary seals is eliminated from the prior embodiment.

There can be requirements for coating materials with specific vapor pressures in order to avoid vaporization of the intended coatings within the vacuum. However, there could also be rotary seals between the units with different degrees of vacuum. For example, the maximum pressure would probably be in the sputtering metallization unit. No possible evaporation problems exist for this unit since no liquid coating is used at this point in the process.

One important aspect of the present invention is an apparatus which combines the E-beam curing unit with the sputtering unit within a single vacuum chamber structure. The timing requirements are placed in a single unit which uses a traveling belt in the sputtering section to follow with and go in register with the web so that the metal is applied only to those areas where the holographic image had been located. As a result, the coating is localized and the E-beam cure of the image is done only locally, because the oligomer was applied locally.

When either metal is applied discretely, say through a "screened" MB belt or is demetallized later (during process steps five and six) with a half-tone pattern, thereby adding another level of security by virtue of what looks like a continuous image but which in fact, when viewed by an appropriate magnifier, is really a screened discontinuous image. A refractive coating may also be used instead of a metal coating. A refractive coating is transparent, allowing the holographic image to be viewed through it.

Even with reasonable pump down and idle times between coating runs (one roll of paper) of say one half hour and with a machine running at 300 feet per minute, a roll diameter of 65 inches and a paper thickness of about 0.004 inches, the system is capable of running almost two rolls of paper per shift and therefore over two million notes per shift (four notes wide across the web).

The sputtering steps may include applying many different metals including aluminum, as well as many variations of diffractive materials.

To summarize the apparatus that performs all of the processing steps between the two spools of the continuous web substrate material, as illustrated in FIG. 13, the following components including an integrated vacuum chamber structure that operates to form micro-images such as holograms on the surface of the substrate:

(a) an unwind unit 83 having a spool of a flexible substrate material;

(b) a first means including a base coating unit 82 for applying a flexible base coat to said material and a curing unit 81 for curing said coat;

(c) a second means including an image coating unit 80 for creating a micro-image by first placing an oligomer on said base coat;

(d) a third means including an image unit 79 having an electron beam radiation source 85 for radiating with electron beams said oligomer-coating on an image drum 84 to cure said micro-image;

(e) a fourth means including a sputtering section 87 having a metallizing image belt 86, a cathode 78 and an anode 89 for metallizing by sputtering techniques a reflective or refractive material on said cured microimage;

(f) a fifth means for demetallizing selected portions of said micro image including a varnish coating unit 77 and curing unit 75 that applies a resistant coating to areas desired to have said material retained, and an ion bombardment unit 88 that then bombards or sputter-etches said micro-image with ions which removes metal from said micro-image in the uncoated areas, thereby abrading away metal on said uncoated areas;

(g) a sixth means including a top coat unit 72 having a curing unit 74 for depositing a top coat on said demetallized micro-image and curing same, to provide security against reproducing the micro-structure; and (h) a rewind unit 73 that receives the processed substrate in a rewind spool upon completion of the above process steps.

The most complete system includes a single vacuum chamber structure having first and second ends, in which said unwind and rewind spools are positioned at said opposing ends, and means for performing the first, second, third, fourth, fifth, and sixth means operate continuously and synchronously within said integrated vacuum chamber. But there are many possible variations, some of which have been previously described. The fifth means may be omitted, for example. The first means may also be omitted from the continuous process, and, if necessary, performed off-line it single vacuum chamber is used if all of the process stations can operate with a single vacuum level. If two or more stations require different vacuum levels for proper operation, they are placed in two or more sub-chambers provided within the vacuum chamber structure.

Indeed, other variations are possible, including a system with only the unwind spool, the second, third and fourth means, and the rewind spool. But when all or most of the means are included, the unwind device and the first means may be positioned outside of the integrated vacuum chamber and in ambient air to permit use of base materials that function only in ambient air. As another alternative, with reference, for example, to FIG. 10, the unwind spool, and the first, second, and third means may all be positioned outside of the integrated vacuum chamber, and in ambient air to permit use of oligomers that function only in ambient air. Further, the sixth means may alternatively be positioned in ambient air to permit overcoat material functional only in ambient air, in which case the rewind spool is also located outside of the vacuum chamber. As can be seen, many variations and different combinations of the described components of the system are possible.

While the invention has been described in connection with what is representably considered to be the most practical and preferred embodiments, it is to be understood that the invention is not to be limited to the disclosed embodiments, but on the contrary, is intended to cover various modifications and equivalent arrangements included within the spirit and scope of the foregoing specification and of the following claims.

It is claimed:

1. A method of treating substrates within a vacuum chamber, comprising:

inserting a supply of untreated substrates into the vacuum chamber while at substantially atmospheric pressure, thereafter reducing pressure within the chamber to a level significantly less than atmospheric pressure, thereafter, within the chamber, applying casting resin to discrete areas of the substrates, thereafter, within the chamber, holding a micro-groove pattern of a transfer surface against a surface of the resin in the discrete areas of the substrates, curing the resin while the transfer surface is being held against the resin, thereafter, within the chamber, separating the transfer surface from the cured resin, thereby to retain the micro-groove pattern in the surface of the casting resin, thereafter, within the chamber, applying a coating of optical material to the resin surface micro-grooves by means of a technique that is normally carried out in a vacuum, said coating allowing light to be reflected from the resin surface micro-groove pattern and which is substantially limited to the discrete areas of the substrates, thereafter adjusting the pressure within the chamber to a level of substantially atmospheric pressure, and thereafter removing the treated substrates from the chamber.

2. The method of claim 1, wherein curing the resin includes doing so by directing a beam of electrons against the resin.

3. The method of claim 1, wherein applying the coating of optical material includes forming a layer of opaque material on the resin surface micro-groove pattern in a manner to conform to the grooves.

4. The method of claim 1, wherein inserting a supply of untreated substrates into the chamber includes inserting a supply roll of a continuous web of flexible material into the chamber, the individual substrates being defined along the length of the web, and wherein removing the treated substrates includes removing a take up roll of the continuous web from the chamber.

5. The method of claim 1, wherein inserting a supply of untreated substrates into the chamber includes inserting the substrates as individual sheets.

6. The method of claim 1, wherein the micro-groove pattern is at least a portion of a device selected from the group consisting of a diffraction pattern, a hologram, sa kinegram and a pixelgram.

7. The method of claim 1, wherein the micro-groove pattern is characterized by diffraction light incident upon it into a diffracted light pattern.

8. The method of claim 1, which additionally comprises, after reducing the pressure within the chamber but before applying casting resin, applying a base coat to the substrates within the chamber and thereafter curing the base coat.

9. The method of claim 1, which additionally comprises, after applying the coating of optical material but before adjusting the chamber pressure to substantially atmospheric pressure, applying, within the vacuum chamber, a substantially smooth protective transparent coating to the coating of optical material.

10. The method of either one of claims 1 or 3, which additionally comprises, after applying the coating of optical material but before adjusting the chamber pressure to substantially atmospheric pressure, of removing, within the vacuum chamber, a portion of the coating of optical material.

11. A system within a vacuum chamber for treating thin, flexible material in a continuous process, comprising:

first and second holders of a roll of a continuous web of said material, the first holder being at a beginning of the process, thereby to supply fresh web material, and the second holder being at an end of the process, thereby to take up and hold the web material after treating, a first processing station including a cylinder having a micro-groove master positioned around its circumference and positioned to hold the master against the web with liquid resin contained there between as the cylinder rotates and the web moves through the first station, said first processing station also including a source of an electron beam directed against the contained resin, thereby to cure the resin, and a second processing station including a metal sputtering system through which the web passes and a mask to limit metal sputtered thereby substantially to areas of the micro-grooved resin, wherein the first and second processing stations are positioned so that the web moves from the first roll holder, then through the first processing station, and then through the second processing station and then to the second roll.

12. The system of claim 11, wherein the micro-groove master includes a plurality of separated elements spaced apart around the circumference of the cylinder.

13. The system of claim 12, wherein the mask of the second processing station moves with the web through the second processing station in synchronism with rotation of the cylinder.

14. The system of claim 11, additionally comprising a third processing station positioned between the second station and the second roll and including a web coating device configured to coat at least areas of the web containing the cured resin and metal coating.

15. The system of claim 11, additionally comprising a third processing station positioned between the second station and the second roll and including a demetallizing device configured to remove some of the metal coating in a defined pattern.

16. An improved method for applying micro-images to a surface of a substrate material using an integrated vacuum chamber, comprising:

(a) providing a flexible substrate material on an unwind spool;

(b) a first process step of applying a flexible base coat to said material and curing said coat;

(c) a second process step of creating a micro-image by placing an oligomer on said base coat; a third process step of radiating with electron beams the oligomer-coating on an imaging drum to cure said micro-image;

(e) a fourth process step comprising metallizing by sputtering techniques a reflective or refractive material on said cured micro-image;

(f) a fifth process step of demetallizing selected portions of said image by applying a resistant coating to areas desired to have said material retained and bombarding or sputter-etching said micro-image with ions which removes metal from said micro-image in the uncoated areas of said fifth process step thereby abrading away metal on said uncoated areas;

(g) providing a rewind spool to receive the processed substrate upon completion of the above process steps; and (h) providing a single vacuum chamber having first and second opposing ends, placing said unwind and rewind spool at said opposing ends, and performing said first, second, third, fourth, and fifth process steps continuously and synchronously within said integrated vacuum chamber.

17. The method of claim 16, wherein said second and third process steps comprise applying an embossable coating to the substrate, curing said coating, and embossing an image onto said coating by heat and pressure.

18. The method of claim 16 wherein said fourth process step comprises metallizing by depositing metal by using a mask with a fixed slot to concentrate the metal deposition onto the micro-imaged surface which prevents depositing of metal except where a desired stripped image appears.

19. The method of claim 16 wherein said second and third process steps are combined by applying said oligomer to said base coat directly through use of an oligomer-dispensing image drum.

20. An improved method for applying micro-images to a surface of a substrate material, comprising:
(a) providing a flexible substrate material on an unwind spool;
(b) a first process step of applying a flexible base coat to said material and curing said coat;
(c) a second process step of creating a micro-image by placing an oligomer on said base coat;
(d) a third process step of radiating with electron beams the oligomer-coating on an imaging drum to cure said micro-image;
(e) a fourth process step comprising metallizing by sputtering techniques a reflective or refractive material on said cured micro-image;
(f) a fifth process step of demetallizing selected portions of said micro image by applying a resistant coating to areas desired to have said material retained and bombarding or sputter-etching said micro-image with ions which removes metal from said micro-image in the uncoated areas of said fifth process step thereby abrading away metal on said uncoated areas;
(g) providing a rewind spool to receive the processed substrate upon completion of the above process steps; and
(h) providing a vacuum chamber in which the second, third, fourth and fifth process steps are performed at a reduced pressure, said unwind spool being placed and said first process step being performed outside said vacuum chamber and in ambient air to permit use of base materials that function only in ambient air.

21. An improved method for applying micro-images to a surface of a substrate material, comprising:
(a) providing a flexible substrate material on an unwind spool;
b) a first process step of applying a flexible base coat to said material and curing said coat;
(c) a second process step of creating a micro-image by placing an oligomer on said base coat;
(d) a third process step of radiating with electron beams the oligomer-coating on an imaging drum to cure said micro-image;
(e) a fourth process step comprising metallizing by sputtering techniques a reflective or refractive material on said cured micro-image;
(f) a fifth process step of demetallizing selected portions of said micro image by applying a resistant coating to areas desired to have said material retained and bombarding or sputter-etching said micro-image with ions which removes metal from said micro-image in the uncoated areas of said fifth process step thereby abrading away metal on said uncoated areas;
(g) providing a rewind spool to receive the processed substrate upon completion of the above process steps; and
(h) all of said method, except the first process step, being continuously and synchronously carried out at a reduced pressure within a vacuum chamber, so as to produce the micro-image bearing product in a single pass-through said method with said first process step being operated separately and off-line, and with the unwind spool carrying the substrate material after processing by the first process step being placed in the vacuum chember prior to said second process step.

22. An improved method for applying micro-images to a surface of a substrate material, comprising:
(a) providing a flexible substrate material on an unwind spool;
(b) first process step of applying a flexible base coat to said material and curing said coat;
(c) a second process step of creating a micro-image by placing an oligomer on said base coat;
(d) a third process step of radiating with electron beams the oligomer-coating on an imaging drum to cure said micro-image;
(e) a fourth process step comprising metallizing by sputtering techniques a reflective or refractive material on said cured micro-image;
(f) a fifth process step of demetallizing selected portions of said micro image by applying a resistant coating to areas desired to have said material retained and bombarding or sputter-etching said micro-image with ions which removes metal from said micro-image in the uncoated areas of said fifth process step thereby abrading away metal on said uncoated areas;
(g) providing a rewind spool to receive the processed substrate upon completion of the above process steps; and
(h) said fourth and fifth process steps being performed at a low pressure within a vacuum chamber, said first, second and third process steps being preformed off-line and not continually and synchronously with said fourth and fifth process steps, the unwind spool carrying the substrate material after processing by the first, second and third process steps being positioned in said vacuum chamber prior to said fourth process step and operating said fourth and fifth process steps continually and synchronously.

23. An improved method for applying micro-images to a surface of a substrate material, comprising:
(a) providing a flexible substrate material on an unwind spool;
(b) a first process step of applying a flexible base coat to said material and curing said coat;
(c) a second process step of creating a micro-image by placing an oligomer on said base coat;
(d) a third process step of radiating with electron beams the oligomer-coating on an imaging drum to cure said micro-image;
(e) a fourth process step comprising metallizing by sputtering techniques a reflective or refractive material on said cured micro-image;
(f) providing a rewind spool to receive the processed substrate upon completion of the above process steps; and
(g) providing a vacuum chamber having first and second opposing ends, placing said unwind and rewind spools at said opposing ends, and performing said first, second, third and fourth process steps continuously and synchronously at a low pressure within said vacuum chamber.

24. An improved method for applying micro-images to a surface of a substrate material, comprising:
(a) providing a flexible substrate material on an unwind spool;
(b) a first process step of creating a micro-image by placing an oligomer on said substrate material;
(c) a second process step of radiating with electron beams the oligomer-coating on an imaging drum to cure said micro-image;

(d) a third process step comprising metallizing by sputtering techniques a reflective or refractive material on said cured micro-image;

(e) a fourth process step of demetallizing selected portions of said micro image by applying a resistant coating to areas desired to have said material retained and bombarding or sputter-etching said micro-image with ions which removes metal from said micro-image in the uncoated areas of said fifth process step thereby abrading away metal on said uncoated areas;

(f) providing a rewind spool to receive the processed substrate upon completion of the above process steps; and (g) providing a vacuum chamber having first and second opposing ends, placing said unwind and rewind spools at said opposing ends, and performing said first, second, third and fourth process steps continuously and synchronously at a low pressure within said vacuum chamber.

25. A method of processing a substrate at a reduced pressure within a vacuum chamber, comprising:

positioning a supply roll of a continuous web of the substrate in flexible form within the vacuum chamber, moving the substrate material continuously within the vacuum chamber through a plurality of processing stations from the supply roll to a take up roll, and performing the following steps in the processing stations:

forming on the substrate a micro-groove pattern on the substrate, wherein forming the micro-groove pattern within said at least a first of the processing stations includes forming discrete areas of the micro-groove pattern that are spaced apart from one another across the substrate, and further wherein forming the reflective layer on the microgroove pattern includes forming a reflective layer in discrete areas that are spaced apart from one another across the substrate over the discrete areas of the micro-groove pattern, thereafter forming a reflective layer on the microgroove pattern that follows a surface relief pattern thereof, and thereafter forming a transparent material over the reflective layer.

26. The method of claim 25, wherein forming the reflective layer includes coating an area of the substrate with a layer of reflective material, followed by removing the reflective material in regions of the substrate in between the discrete areas of the micro-groove pattern.

27. A method of processing a substrate at a reduced pressure within a vacuum chamber, comprising:

positioning a supply roll of a continuous web of the substrate in flexible form within the vacuum chamber, moving the substrate material continuously within the vacuum chamber through a plurality of processing stations from the supply roll to a take up roll, and performing the following steps in the processing stations:

forming on the substrate a micro-groove pattern on the substrate, thereafter forming a reflective layer on the microgroove pattern that follows a surface relief pattern thereof, thereafter removing a portion of the reflective layer according to a pattern, and thereafter forming a transparent material over the reflective layer.

28. The method of any one of claims 25–27, wherein forming the reflective layer includes forming a layer of metallic material in the second of the processing stations.

29. The method of any one of claims 25–27, wherein the substrate is paper material.

* * * * *

UNITED STATES PATENT AND TRADEMARK OFFICE
CERTIFICATE OF CORRECTION

| | | |
|---|---|---|
| PATENT NO. | : 6,440,277 B1 | Page 1 of 1 |
| DATED | : August 27, 2002 | |
| INVENTOR(S) | : Salvatore F. D'Amato | |

It is certified that error appears in the above-identified patent and that said Letters Patent is hereby corrected as shown below:

<u>Title page,</u>
Item [73], please add the omitted Assignee information:
-- Assignee: American Bank Note Holographics, Inc., Elmsford, New York --
Item [74], please add the omitted *Attorney, Agent, or Firm*:
-- *Attorney, Agent, or Firm*–Skjerven Morrill LLP --

<u>Column 15,</u>
Line 29, after "hologram,", delete "sa" and insert -- a --.
Line 32, after "characterized by", delete "diffraction" and insert -- diffracting --.

<u>Column 16,</u>
Line 17, after "second", delete "roil" and insert -- roll --.
Line 33, after "oligomer", insert -- on said base coat; --.
Line 34, before "a third", delete "on said base coat;" and insert -- (d) --.
Line 41, after "said", insert -- micro --.

<u>Column 17,</u>
Line 65, after "vacuum", delete "chember" and insert -- chamber --.

<u>Column 18,</u>
Line 5, after "(b)", insert -- a --.

Signed and Sealed this

Seventh Day of January, 2003

JAMES E. ROGAN
*Director of the United States Patent and Trademark Office*